June 19, 1962 J. P. LEKAS 3,039,319

MAGNETIC TAPE RECORDER

Filed May 13, 1955 11 Sheets-Sheet 1

INVENTOR.
JOHN P. LEKAS
BY John L. Jackson
ATTORNEY

June 19, 1962 J. P. LEKAS 3,039,319

MAGNETIC TAPE RECORDER

Filed May 13, 1955 11 Sheets-Sheet 2

INVENTOR.
JOHN P. LEKAS

BY John L. Jackson

ATTORNEY

June 19, 1962 J. P. LEKAS 3,039,319

MAGNETIC TAPE RECORDER

Filed May 13, 1955 11 Sheets-Sheet 3

INVENTOR.
JOHN P. LEKAS
BY John L. Jackson
ATTORNEY

INVENTOR.
JOHN P. LEKAS
BY John L. Jackson
ATTORNEY

INVENTOR.
JOHN P. LEKAS

BY John L. Jackson
ATTORNEY

*INVENTOR.*
JOHN P. LEKAS

*BY* John L. Jackson

ATTORNEY

INVENTOR.
JOHN P. LEKAS
BY John L. Jackson
ATTORNEY

June 19, 1962 J. P. LEKAS 3,039,319

MAGNETIC TAPE RECORDER

Filed May 13, 1955 11 Sheets-Sheet 8

*INVENTOR.*
JOHN P. LEKAS

*BY* John L. Jackson

ATTORNEY

MAGNETIC TAPE RECORDER

Filed May 13, 1955 11 Sheets-Sheet 9

INVENTOR.
JOHN P. LEKAS
BY John L. Jackson
ATTORNEY

MAGNETIC TAPE RECORDER

Filed May 13, 1955 11 Sheets-Sheet 10

INVENTOR.
JOHN P. LEKAS
BY John L Jackson
ATTORNEY

INVENTOR.
JOHN P. LEKAS
BY John L. Jackson
ATTORNEY

United States Patent Office 3,039,319
Patented June 19, 1962

3,039,319

MAGNETIC TAPE RECORDER

John P. Lekas, 2062 Vine St., Hollywood, Calif.

Filed May 13, 1955, Ser. No. 508,057
4 Claims. (Cl. 74—194)

This invention relates to an improved magnetic tape recorder and has for one of its principal objects the provision of a device of the class described which includes an automatic two-way play mechanism which is capable of reversing the direction of tape travel at any designated point or time.

Another important object of the invention is to provide a tape recorder of the magnetic type, the speed of which is variable and manually controlled as desired.

Another object of the invention is to provide a magnetic tape recorder which is capable of handling reels of two different sizes with equal facility.

A further object of the invention is to provide a tape recorder which includes a high-speed differential two-way wind, a high visibility slot whereby insertion of the tape is rendered simple and easy and a set of simplified, smooth operating controls.

Yet another object of the invention contemplates the provision of a tape recorder mechanism in which the pay-off and take-up reels are arranged one over the other in coaxial relationship, thereby conserving space.

Another object includes the provision of a capstan drive, which in addition to being reversible either manually or automatically, can be varied in speed as desired.

Another object resides in a frictional drive arrangement for the reels which is so constructed as to urge the tape to be under constant tension at all times when the device is in operation.

Another object is to provide means for de-magnetizing the recording tape whenever desired, whereby the same may be re-used for another recording, and without removing the same from the machine.

Other and further important objects of the invention will be apparent from the disclosures in the accompanying drawings and following specification.

The invention, in a preferred form, is illustrated in the drawings and hereinafter more fully described.

Figures 3, 27:
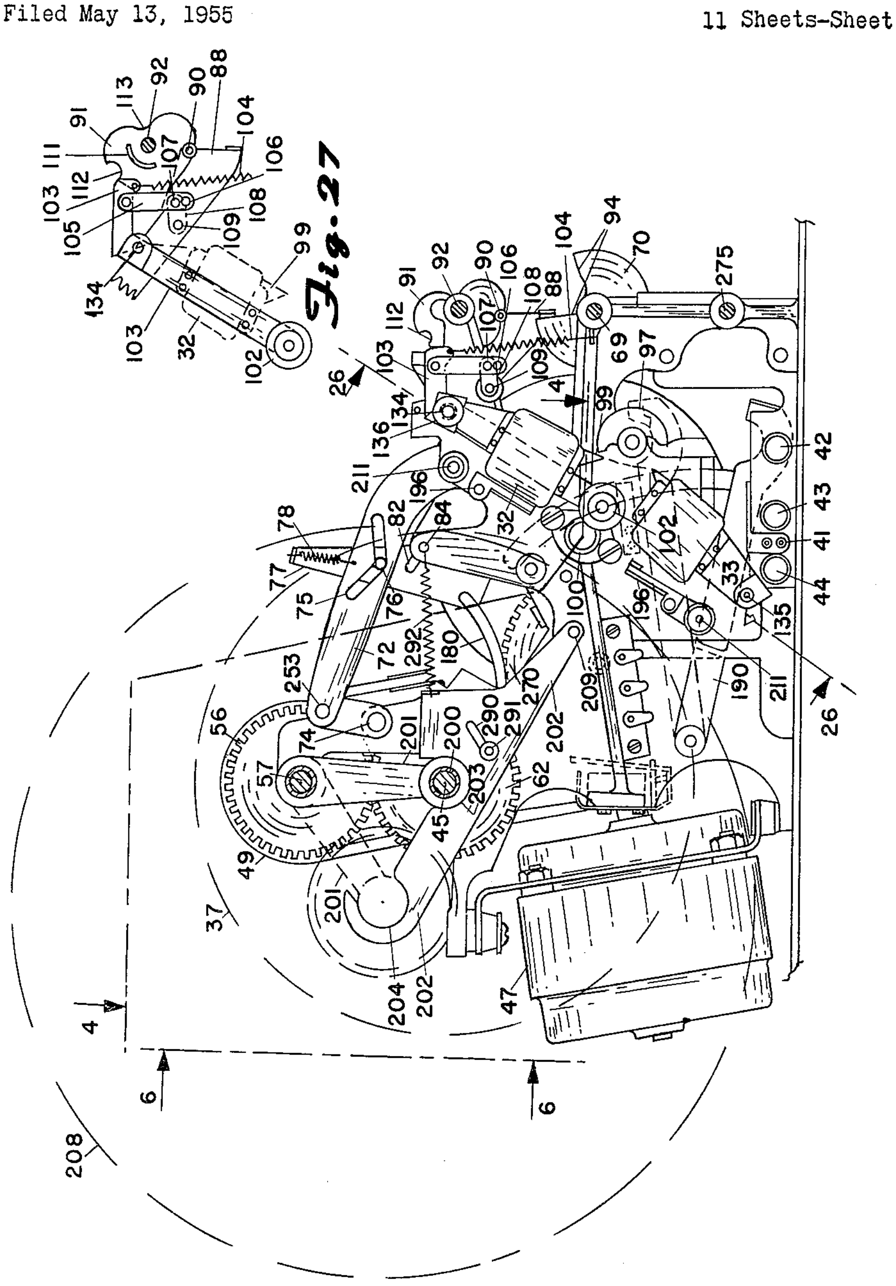

FIGURE 3 is a view of the assembled mechanism showing the operating motor, various gears, the play-heads, the controls for same, and illustrating two different sizes of reels which can be used in the machine. These reels are shown in dash or phantom lines. In this figure, the play-heads are shown in a position different from that illustrated in FIGURE 2, in which event the tape would be travelling in an opposite direction.

Figures 4, 5:
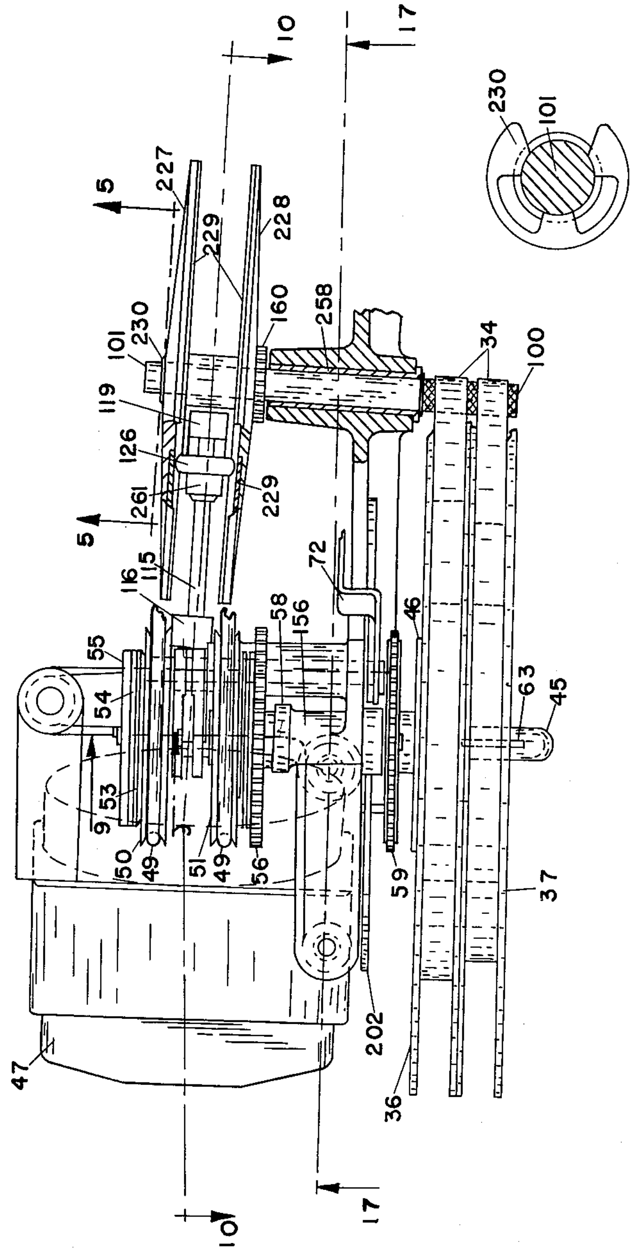

FIGURE 4 is a partial plan view of the motor and drive assembly, and this is taken along the planes of the broken line 4—4 of FIGURE 3.

FIGURE 5 is an enlarged section through the capstan drive shaft and is taken along the line 5—5 of FIGURE 4, looking in the direction indicated by the arrows. This view shows in some particularity the E-rings which drivingly connect the capstan shaft to its drive discs.

Figure 6:
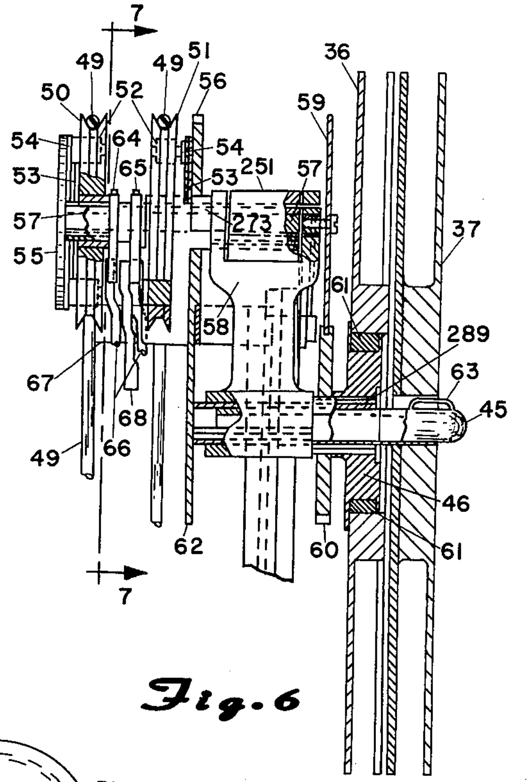

FIGURE 6 is a slightly enlarged section taken on the plane of the line 6—6 of FIGURE 3, showing particularly the driving pulleys for the tape reels and the friction clutches associated therewith.

Figures 7, 11:
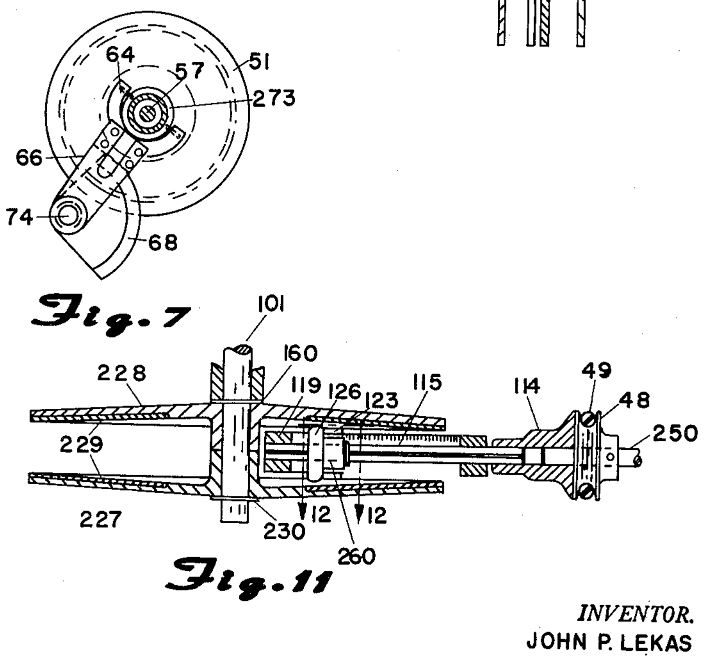

FIGURE 7 is a section of the line 7—7 of FIGURE 6 illustrating more details of the clutch arrangement.

Figure 8:
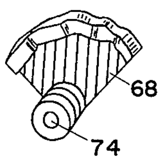

FIGURE 8 is a perspective view of the two-sided control cam for the clutch shown in FIGURE 7.

Figure 9:
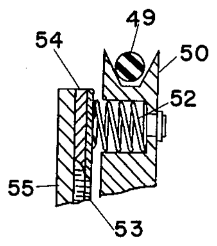

FIGURE 9 is a partial, somewhat enlarged section on the plane of the line 9—9 of FIGURE 4, showing the details of the clutch friction plate and its pulley.

Figures 10, 12, 13:
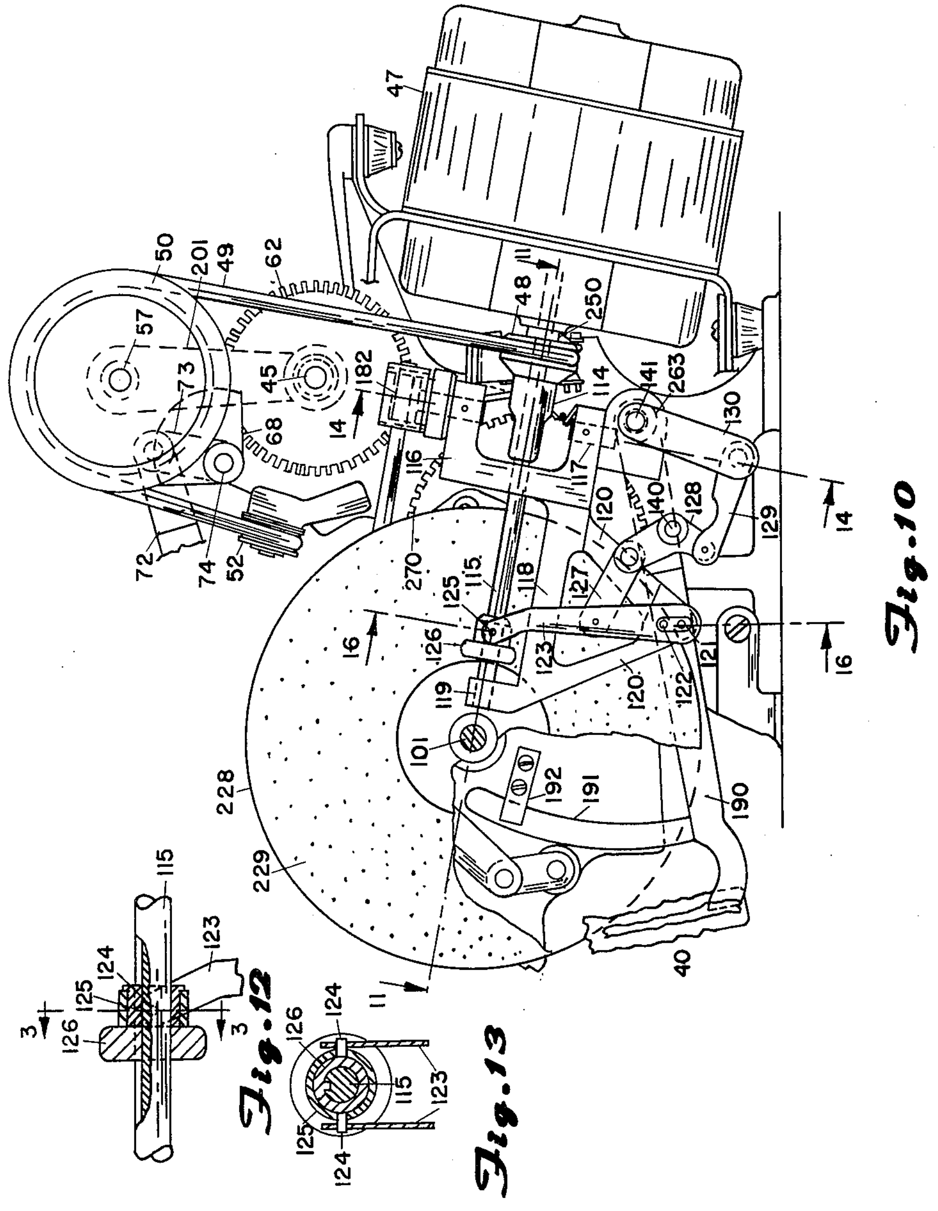

FIGURE 10 is an elevation showing the motor, the driving means and the associated parts, all as viewed along the line 10—10 of FIGURE 4.

FIGURE 11 is a substantially horizontal sectional view taken on the plane of the line 11—11 of FIGURE 10, and showing the two drive discs, the flexible drive shaft and its pulley, which is on the motor shaft. This figure, like FIGURE 4, shows the driving elements in neutral position.

FIGURE 12 is a slightly enlarged section taken on the line 12—12 of FIGURE 11, showing more details of the drive pinion bushings and the relationship of same to the drive shaft, whereby a manual shifting of the drive element longitudinally of the shaft is possible, while at the same time including a positive drive connection. This is for the speed control.

FIGURE 13 is a section on the line 13—13 of FIGURE 12.

Figure 14:
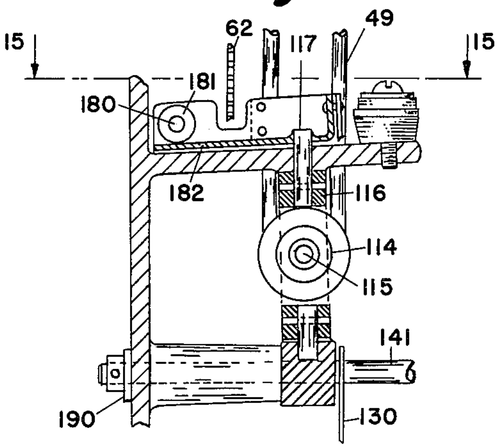

FIGURE 14 is a section on the line 14—14 of FIGURE 10, showing the yoke and support for the drive shaft together with a portion of its shifting means.

Figure 15:
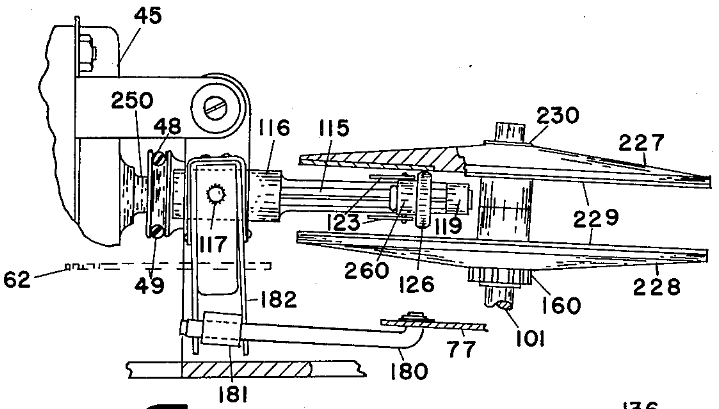

FIGURE 15 is a plan view of the drive shaft shifting elements, some of which are illustrated in FIGURE 14, and this view is taken on the line 15—15 of FIGURE 14. In this driving position, the reels and tape will move in the direction shown in FIGURE 2.

Figures 16, 28:
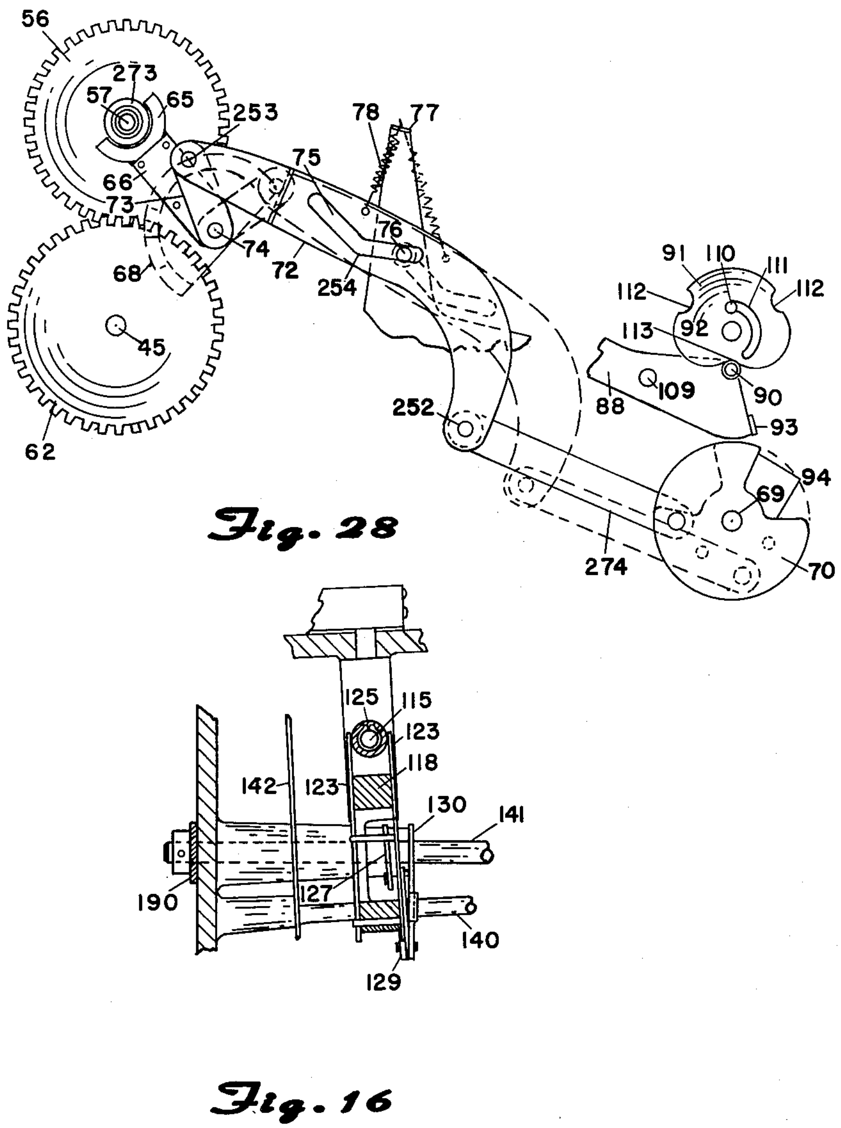

FIGURE 16 is a section showing the variable drive control levers and links and is taken on the line 16—16 of FIGURE 10.

Figure 17:
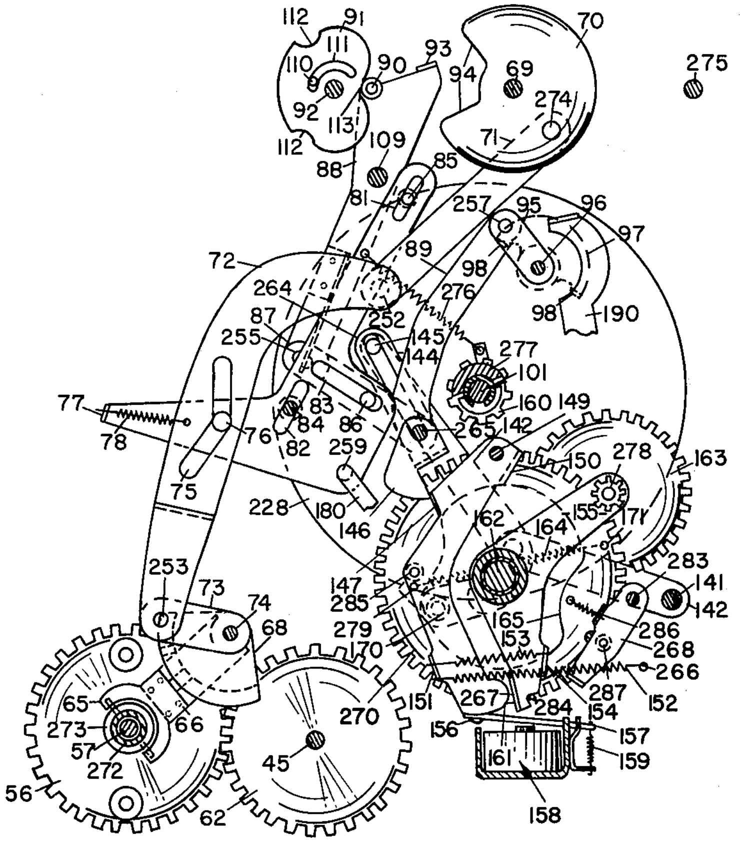

FIG. 17 illustrates somewhat schematically the control levers and associated parts for the play and re-winding operations. This figure is taken along the line 17—17 of FIGURE 4 and shows particularly the device in automatic spring-loaded position, whereby the next reversal of movement of the tape, either manual or automatic, can be accomplished.

Figures 18, 19:
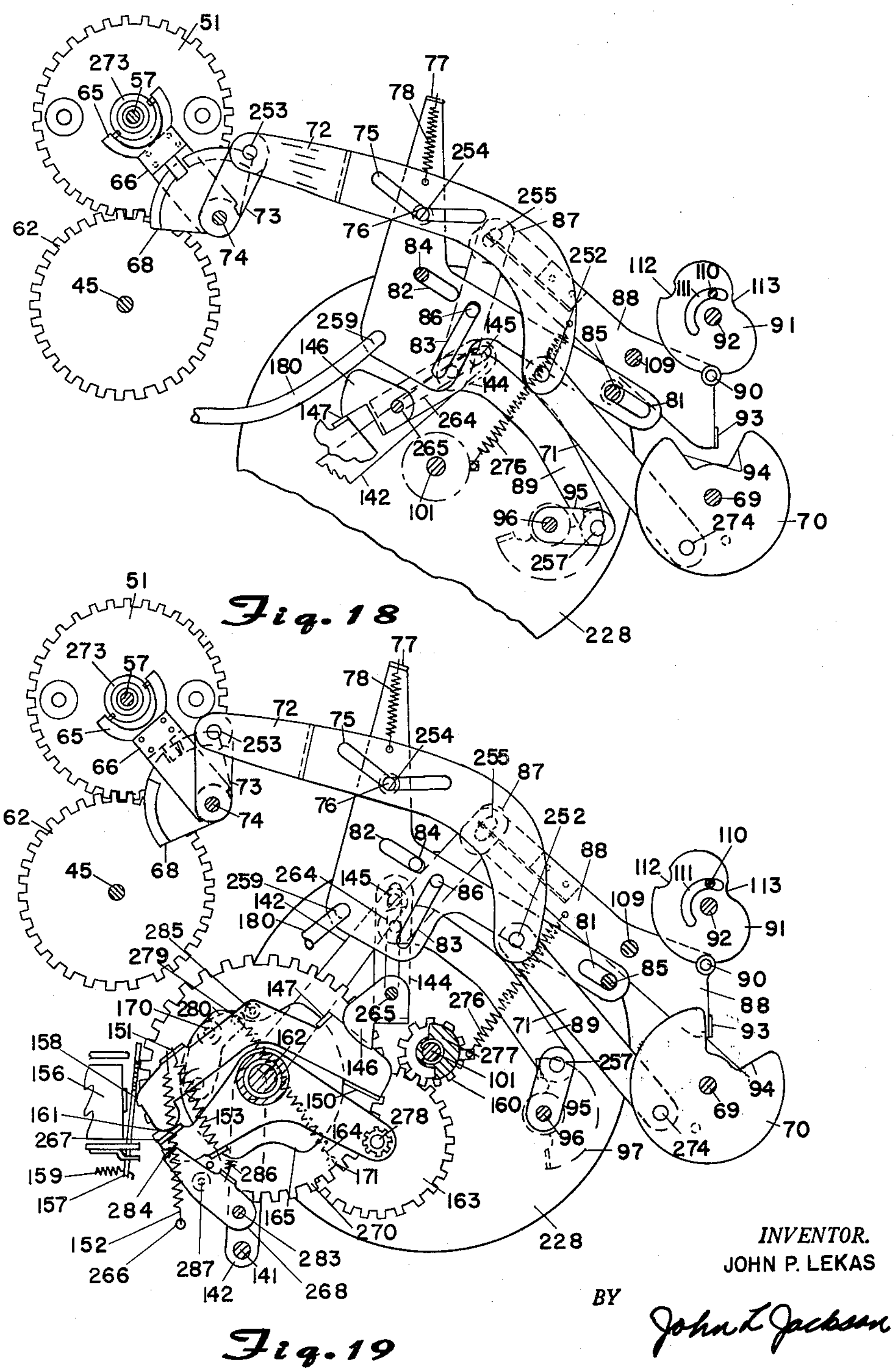

FIGURE 18 is a view similar to FIGURE 17 showing more particularly the control levers which place the device in one recording position.

FIGURE 19 is a view similar to FIGURE 18 but with the parts in the other recording position, and this figure also illustrates the position of the spring-loading and lever control mechanism as it appears at the instant of either the automatic or manual reversing operation.

Figures 20, 21, 22, 23, 24:
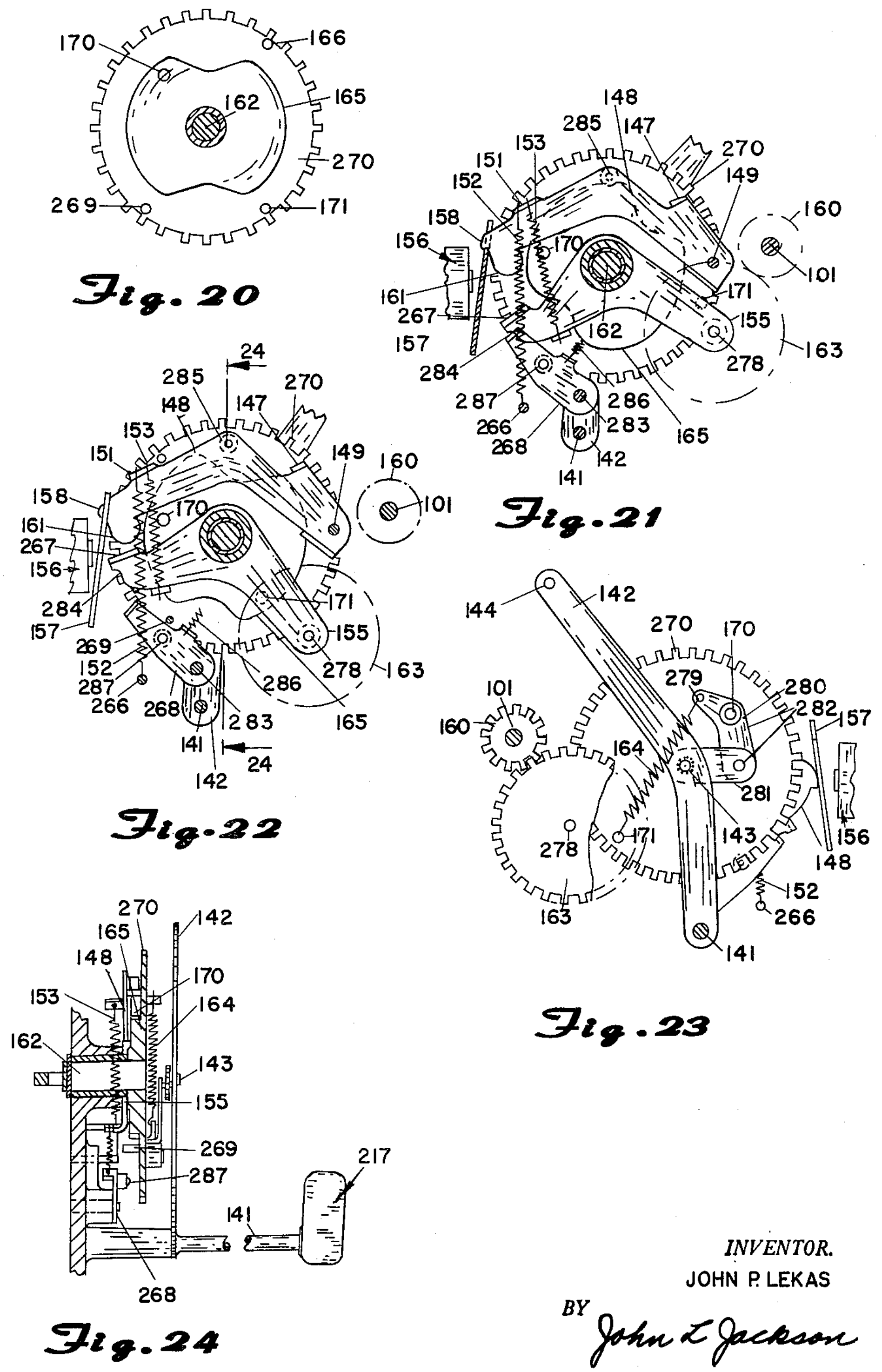

FIGURE 20 is a face view of the gear and cam which is associated with the trip lever for pre-loading of the automatic or manual shift.

FIGURE 21 is a view of the assembled parts of the pre-loading mechanism.

FIGURE 22 is a view of the same parts in another position.

FIGURE 23 is a view of the gear and the direction shift lever, and is taken from the opposite side of the showing of FIGURES 20, 21 and 22.

FIGURE 24 is a vertical section taken on the line 24—24 of FIGURE 22.

Figure 25:
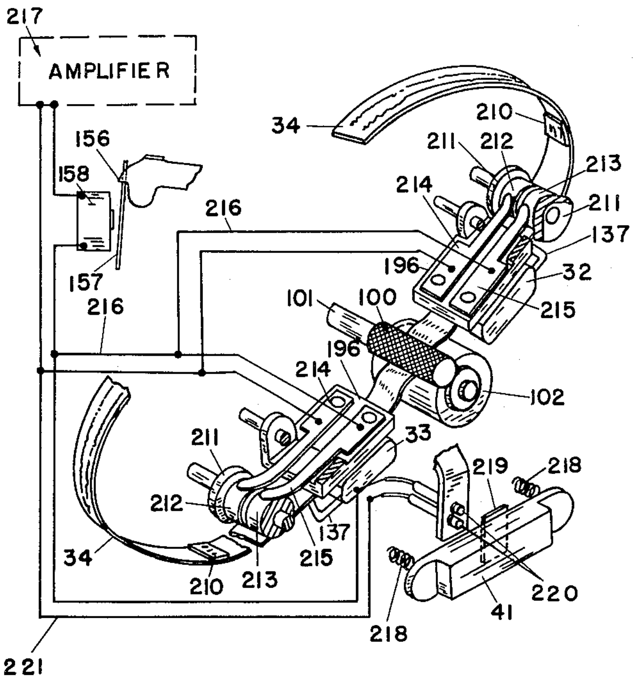

FIGURE 25 is a perspective view showing the recording tape, its relationship to the capstan drive, and this figure includes a wiring diagram showing the electrically operated automatic and manual direction change means.

Figure 26:
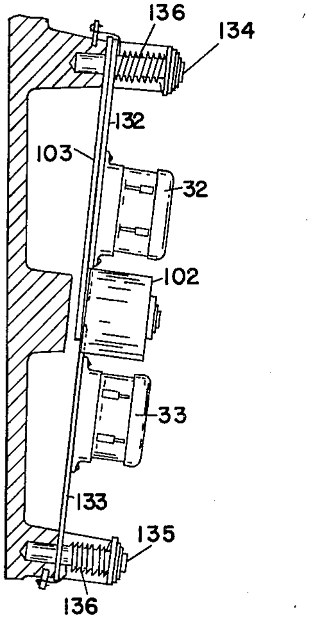

FIGURE 26 is a section on the line 26—26 of FIGURE 3, showing the recording or play-heads and the tape driving roller.

FIGURE 27 is a detail view illustrating the mechanism behind the upper play-head of FIGURE 3, whereby the friction roller is moved into bearing position against the tape when the tape travels over the capstan.

FIGURE 28 illustrates in more detail the lever which is shifted for rewind in either direction.

Figure 29:
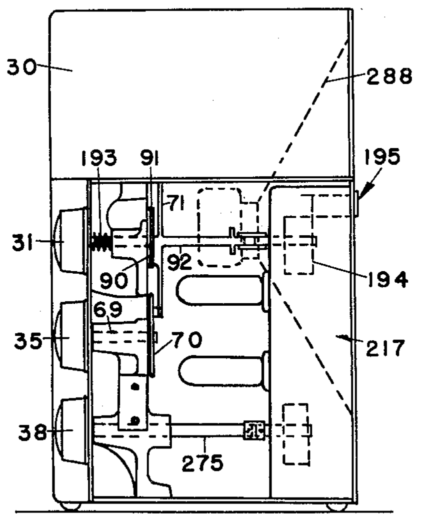

FIGURE 29 illustrates the control knobs and the associated cam and levers whereby the device can be used for either play or recording.

Figure 1:
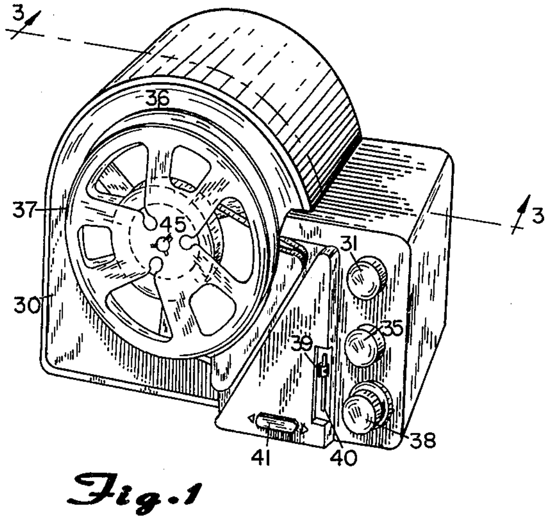
FIGURE 1 is a perspective view of the improved magnetic tape recorder of this invention, showing the same in its containing housing or cabinet.
Figure 2:
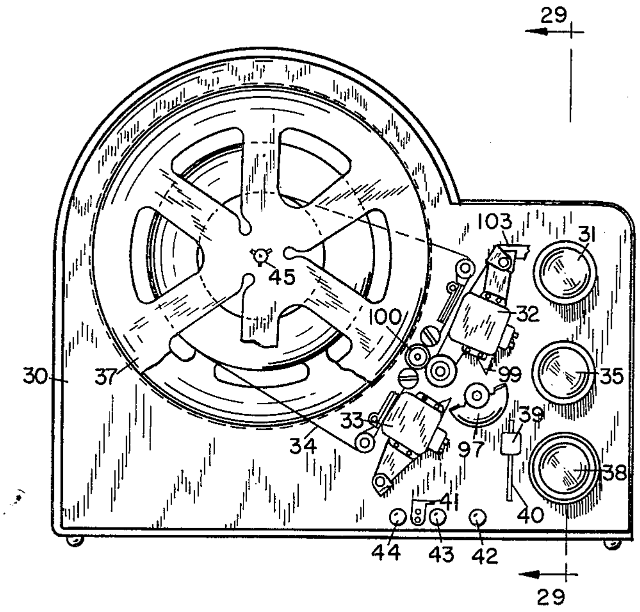
FIGURE 2 is a front elevation of the device with the guard removed, showing the play-heads in position for sound reproduction from the tape when it is moving in the direction indicated by the arrows.

As shown in the drawings:

The reference numeral 30 indicates the housing or case for the improved magnetic tape recorder of this invention. This is provided with three operating knobs as shown in FIGURES 1 and 2. The knob 31 is for the purpose of shifting the two play-heads or recording heads 32 and 33 into and out of operating position with respect to the tape 34. It also controls the demagnetizing and recording operations.

The knob 35 is for the purpose of shifting the cam which controls the friction clutches for driving the reels 36 and 37, and for rewind operation.

The knob 38 mounted on shaft 275 is for the operating switch and volume control.

A vertically movable speed control knob 39 is mounted in a slot 40 in the front of the case 30 adjacent the operating knobs and a manually controlled electric switch for reversing the direction of the tape, is provided at 41. Three pilot lights are provided, the one indicated by the reference numeral 42 being for the purpose of indicating level of the recording volume, and the ones indicated by the reference numerals 43 and 44 being for the purpose of indicating the direction of rotation of the tape 34 and the reels 36 and 37.

The outer reel 37 is removably mounted on a shaft 45 and the inner reel 36 is removably mounted upon a drum 46, as best shown in FIGURE 6.

A constant speed motor 47 is provided and a pulley 48 is mounted on the motor shaft 250, having a belt 49 travelling therein.

This belt moves in two reel pulleys 50 and 51 (FIGURES 4, 6 and 10) and over an adjustable idler 52. These pulleys 50 and 51 will therefore rotate in opposite directions at all times.

Referring more particularly to FIGURES 6 and 9, it will be noted that a plurality of clutch pressure springs 52 are mounted in recesses in the pulleys 50 and 51. These springs normally urge thrust plates 53, having felt facings 54, against a clutch plate or disc 55, which is adjacent the pulley 50, and alternatively against a gear 56 which is adjacent the pulley 51. The clutch plate 55 is fixed on a shaft 57 which is suitably supported by bearings 251 in a yoke 58 and a gear 59 is fixed on the other end of the shaft 57. This gear 59 is in mesh with a gear 60 which in turn is connected to the drum 46 upon which the reel 36 is removably mounted. This removable mounting can be in the shape of a rubber or other annulus 61 or can comprise a set of spring pressed balls in the drum which would fit into corresponding recesses in the reel hub.

The gear 56 which is mounted upon shaft 273 is in mesh with a reel shaft drive year 62 which is mounted on the shaft 45 upon the end of which shaft the reel 37 is removably fitted by means of a slot and spring arrangement 63. The drum 46 is separated from the shaft 45 by bearing 289, The pulleys 50 and 51 are slidable with relation to the shaft 57 and in order to govern the respective positions of these two pulleys 50 and 51 and their frictional engagement with the plate 55 on the one hand and the gear 56 on the other, there is provided a pair of bifurcated clutch fingers or rewind yokes 64 and 65, (FIGURE 7). These fingers or yokes ride loosely over the shaft 57 and are rigidly secured to leaf-springs 66, which springs 66 are mounted on the frame extension 67. The position of these bifurcated clutch fingers 64 and 65 is governed by a double faced rewind cam 68 (FIGURE 8) which may be rotated to cause either pulley 50 or 51 to be shifted upon the axis of its supporting shaft 57 or to increase or decrease the pressure upon its adjacent clutch facing 54. It will be noted as shown in FIG. 7 that shaft 57 is contained within shaft 273 and separated therefrom by bearing 272.

In the position shown in FIGURE 6, for example, finger 64 is pressed to the left against the action of the leaf-spring 66 and pushes against the pulley 50. This pulley 50 is therefore thrust towards the clutch plate 55, causing frictional engagement of the clutch plate 55 and the pulley 50 through the clutch facing 54. This action causes the pulley 50 to drive the clutch plate 55 and the shaft 57 with its gear 59 thereon. This gear 59 being in mesh with the gear 60 causes the reel 36 to be driven more strongly than the reel 37, which indirectly is driven by the pulley 51 through the gears 56 and 62. The result is that if the tape 34 is secured to both reels 36 and 37 as is proper, reel 36 will wind up the tape 34 at the expense of reel 37, and the machine can therefore accordingly be said to be in the process of rewinding. The shifting of the cam 68 is accomplished by the rotation of the knob 35 which, through its supporting shaft 69 (FIGURE 29), rotates a plate 70, which might be termed a record-play cam. A rewind link 71 is attached to the periphery of the plate or cam 70 by pin 274 (FIGURE 28), and as the plate 70 is rotated, the link 71 is moved from the position shown in the full lines in FIGURE 28 to that shown in the dash lines, and this in turn shifts a curved link or rewind shift arm 72, which is pivotally mounted on pin 252 which is located near the end of the link 71, and this accordingly moves a short link or rewind cam shaft arm 73, which is pivotally mounted on pin 253 at one end of the link 72. The other end of the link or arm 73 is fixed on the shaft 74 which supports the cam 68.

An obtuse angled slot 75 is formed in the link 72, and a pin 76 mounted on a support 77 rides in this slot 75. When the pin 76 is at the apex 254 of the slot 75, the double sided clutch element 68 is in an intermediate position so far as the bifurcated clutch operating fingers 64 and 65 are concerned. When the knob 35 is turned clockwise, the link 72 will move so that the pin 76 is in the right hand end of the slot, as seen in FIGURE 28. This causes the pulley 50 to move into frictional clutch engagement with the plate 55. When the knob 35 is turned counter-clockwise, the link 72 shifts so that the pin 76 is in the left hand end of the slot 75, as best shown by the dash lines in FIGURE 28, and frictional clutch engagement will then be made between the pulley 51 and the gear 56.

A helical spring 78 connects the link 72 to the top of the support 77, thereby assuring a snap action of the clutch element 68 to neutral position whenever movement of the knob 35 is initiated. A pin 79 on the rewind arm cam 70 limits rotation of the knob 35 in a counter-clockwise direction by contacting the link 71, and rotation of the knob 35 in a clockwise direction is limited by the extent of movement of the pin 76 in the slot 75.

The support or bail bar 77 is in itself movable with respect to the frame of the machine and as best shown in FIGURES 3, 17, 18 and 19, includes an integral lower arm 80, having a slot 81 therein and two more slots 82 and 83 are also formed in the element 77—80. A pin 84 mounted on the frame of the machine (FIGURE 3), rides in the slot 82, and this assists in positioning the element 77. Another pin 85 rides in the slot 81 of the extension 80 and this pin 85, being fixed on the frame of the machine, also assists in maintaining the element 77—80 in proper operating position.

A third pin 86 is provided for the slot 83 (FIGURES 17, 18 and 19), and this pin is fixed on a bail bar link arm 87, which itself is pivotally connected at points 255 and 256 to the ends of two other links 88 and 89 respectively.

The link 88, which might be called a record play rocker, is fixed on a shaft 109 pivoted in the frame and has a roller 90 mounted at its outer end. This roller 90 is always in operating contact with a record-play cam 91, which cam 91 is mounted on a shaft 92 operated by the knob 31 (FIGURE 29). As shown in FIGURES 17, 18, and 19, a helical spring 276 attached between the link 88 and the frame of the machine forces the roller 90 into operating contact with the record-play cam 91.

An integral extension 93 is on the end of the rocker link 88 adjacent the roller 90 and when the knob 31 is moved into either extremity of its operating limit, this extension is moved into a notch 94 in a rewind arm cam 70, thereby correspondingly limiting movement of the knob 35 which is fixed upon the shaft 69 and accordingly operates the rewind plate 70 and its linkages.

The link or head cam shaft link arm 89 extends downwardly, as best shown in FIGURES 17, 18 and 19, and is pivotally connected at its lower end at point 257 with a head cam actuater 95 fixed on a shaft 96, which extends through a suitable bearing in the frame of the machine.

A semi-circular play-head operating cam 97 is mounted on the outer end of the shaft 96, and this is provided with two integral bent-over extensions 98. These extensions are adapted to alternately contact juxtaposed projections 99 fixed on the play-heads 32 and 33 (FIGURE 3). Accordingly, turning the knob 31 will bring one or the other of the recording or play-heads 32 or 33 into operating contact with the tape 34. As shown in FIGURE 26 each play-head 32 or 33 is mounted upon a supporting plate 132 and 133 respectively, and by means of these are pivoted on supporting pins 134 and 135 respectively. Springs 136 at these pivot points 134 and 135 act to normally hold one or the other of the play-heads 32 or 33 out of operative position (FIGURE 26), and wires 137 lead to the amplifier and speaker apparatus.

The tape 34 is driven or carried past the play-heads 32 and 33 by a capstan 100 (FIGURES 2, 3, 4 and 25). This capstan 100 forms part of a shaft 101 mounted in suitable bearings 258 in the machine frame and is preferably knurled as shown in order to afford a better driving grip on the tape 34. A roller 102 of relatively soft rubber or the like is moved into contact with the tape 34 and the capstan 100 at the same time that one of the play or recording heads 32 or 33 is shifted into operative relationship with the tape 34. This roller 102 is mounted on the end of a bell-crank lever 103 which is pivoted on the pin 134, which lever 103 also supports the play-head 32 (FIGURES 26 and 27). A spring 104 is connected to the end of the bell-crank lever 103 and this normally constrains the roller 102 to move into operative contact with the capstan 100 and tape 34. A link 105 is connected to the end of the bell-crank lever 103 adjacent the connection to the spring 104, and this link 105 has a slot 106 in its lower end with a pin 107 riding therein. The pin 107 is in turn fixed on a short arm 108 mounted on one end of a shaft 109. This shaft 109 is fitted into bearings in the frame of the machine and the record-play rocker arm 88 is fixed on its other end. When the knob 31 and its cam plate 91 are rotated to move one or the other of the play-heads 32 or 33 into position, as previously described, thereby moving the cam 91 from the position shown in FIGURE 17 to the position shown in FIGURES 18 and 19, the shaft 109 will be accordingly turned through a few degrees of arc, thereby shifting the arm 108 and the pin 107 with respect to the link 105. The slot 106 in this link allows for some lost motion but sufficient movement will result to tilt the bell-crank 103 about its pivot 134 and move the roller 102 into desired tape driving position. A pin 110 fixed on the frame of the machine rides in a slot 111 in the cam 91 for limiting its extent of movement and notches 112 are provided in the cam for receiving the roller 90 at either end of such movement. An intermediate depression 113 is in the cam 91 and when the roller 90 is in this depression, as shown in FIGURE 28, neither one of the play-heads 32 or 33 nor the roller 102 is in contact with the tape 34. Therefore, the tape 34 will not move nor will any recording occur even though the switch controlled by the knob 38 is on and the motor 47 is running. This is, of course, assuming that the knob 35 which operates the friction clutch cam 68 is also in neutral position, as shown in FIGURE 18. If, however, the knob 35 is turned in a clockwise direction, thereby shifting the clutch elements into the position shown in FIGURE 6, the inside reel 36 will also be constrained to move in a clockwise direction looking from the front of the apparatus, and this will act to wind the tape 34 on to said reel 36 and off of the reel 37. This is merely a rewinding operation, and no play or recording will result. When the knob 35 is moved counter-clockwise, a shifting of the clutches shown in FIGURE 6 will result, and tape 34 will be wound upon the outer reel 37 and from the inner reel 36. Obviously this is a relatively fast rewinding operation in either direction, and the speed of same depends practically upon the motor speed.

Referring now to FIGURES 4, 10, 11 and 15, it will be noted that the shaft 250 of the motor 47 has a flexible coupling 114 thereon into which a shaft 115 is fitted. This shaft 115 is mounted in a suitable bearing 260 in a yoke 116, which yoke 116 is pivoted at 117 so as to be capable of movement from side to side. The yoke 116 has an integral extension 118 which is parallel to the shaft 115 and terminates in a bearing 119 which receives the outer end of the shaft 115. The yoke 116 also has an integral downward V-shaped extension 120. A pin 121 passes through the apex of this extension 120 extending on both sides thereof, and the ends of this pin 121 ride in slots 122 in leaf-spring elements 123 which extend upwardly to the level of the shaft 115. Each of these leaf-spring elements 123 has an inwardly projecting pin 124 fixed in its ends (FIGURE 13), and these pins ride in an annulus 125, located within the hub 261 of the driving wheel or roller 126 (FIGURE 12).

This annulus 125 surmounts the hub 261 of a driving wheel or roller 126 which is keyed on to the shaft 115 so as to rotate therewith but be freely slidable thereon. The driving wheel or roller 126 can accordingly be shifted to contact either one of the two capstan driving discs 227 or 228, each of which is lined with some friction material such as rubber or the like 229. Sliding of the drive roller 126 on its shaft 115 will cause a corresponding variation in the speed of the capstan driving discs 227 or 228 and that of the capstan 100. The drive roller 126 is shown in contact with the disc 227 in FIGURE 15, and is shown in a neutral non-driving position in FIGURES 4 and 11. Both discs 227 and 228 are frictionally mounted on shaft 101 of the capstan 100 and are held in position with relation to the shaft and to each other by means of an E-ring 230, as best shown in FIGURES 4 and 5. This positioning assures of a normal driving operation of the tape 34 but allows of slippage under abnormal stress conditions which might otherwise cause damage.

Connected to the middle portions 262 of the two spring arms 123 is a series of links and bell-crank levers 127, 128, 129 and 130 (FIGURE 10). The bell-crank lever 128 is pivoted at 140 on the frame of the machine and the link 130 is fixed on a shaft 141 mounted in suitable bearings 263 in the frame. This shaft 141 extends transversely of the apparatus (FIGURE 14).

Pinned to the other end of the shaft 141 is a direction shift lever 142 (FIGURE 23). This includes a central pin 143 and its upper end is provided with another pin 144 which moves in a slot 264 which extends longitudinally of a bracket arm 145 (FIGURES 17, 18 and 19). The lower end of this bracket arm 145 is mounted on a shaft 265 which is in suitable bearings in the machine frame, and this arm can therefore swing from the position shown in FIGURE 18 to that shown in FIGURE 19. The bracket arm 145 is provided with an integral hook-like extension 146 and this hook-like extension is adapted to alternately contact the upper face of a projection 147 on an element 148. This element 148 is pivoted at 149 on a pin in the machine frame, and in addition bracket arm 145 is provided with another integral bent-over extension 150 adjacent this pivot point.

A third bent-over extension 151 is provided on the element 148 at its other end and two helical springs 152 and 153 are connected to this extension 151. One spring 152 is fastened to a pin 266 on the machine frame and the other spring 153 is fastened to an extension 154 of element 155.

The element 148 is provided with an integral latching extension 156 which moves in and out of a notch in an armature 157 forming part of a solenoid or electro-magnet 158, and which armature 157 is normally held in extended position by means of a spring 159. The detent or latch element 156 is shown in locked relationship with the armature 157 in FIGURE 17, and in released relationship in FIGURE 19.

A gear 160 is mounted on the shaft 101 adjacent the drive disc 228 (FIGURES 4 and 19), and when the machine is in operation, this gear 160 is rotating in one direction or another, depending upon the position of the drive roller 126. When the bell-crank element 148 is in its unlatched position as shown in FIGURE 19, its integral nose 161, just below the projection 156, will contact an extension 267 on the somewhat similar bell-crank 155 which is pivotally mounted on a shaft 162. The other end of this bell-crank 155 carries a gear 163 and when the bell-crank 155 is thus shifted, this gear 163 will be carried into mesh with the gear 160 which is mounted on the shaft 101 and held by a retaining ring 277 and will assume the position shown in FIGURE 19. The gear 163 will accordingly rotate, and with the parts in the position shown in FIGURE 19, this rotation will be counter-clockwise, and the rotation of the driving wheel 228 will accordingly be clockwise. Thus when driving discs 227 or 228 rotate, the gear 160 is rotated which is in mesh with gear 163. Mounted on gear 163 is gear 278 which meshes with gear 270 at the same time that gear 163 meshes with gear 160. Continued rotation of the gear 163 will stretch a pre-load spring 164 attached between one side of gear 270 and a pin 279 on rocker 280 which is pivoted to the opposite side of gear 270. One end of connector link 281 is pivotally to point 282 on the connector or link 280 while its opposite end is connected to the central pin 143 on the direction shift lever 142. Cam 165 moves the bell-crank 148 up into the position shown in FIGURE 17 when the same will be automatically locked in that position.

In FIGURE 17, the parts are represented as in neutral position and with the tape reversing assembly mechanism as having been set in spring-loaded position ready for the next reversal, either automatic or manual. In FIGURE 19, the positions of the spring-loading and lever control mechanism are shown at the instant of either the automatic or manual reversing operation.

FIGURE 21 shows that the re-load operation takes place for just half a cycle, or 180° of rotation. The operation is alternate, being half a cycle in one direction and half a cycle back.

FIGURE 22 shows the bell crank 148 latched in the magnet lever while the lever 155 which carries the intermediate pinion 163 is shown released from its latch 268, whereby the pinion 163 are disengaged from the gear 160 on the shaft 101. This lever 155 is pushed into a position of engagement by the nose 161 of lever 148 and is held in engagement position by the latch 268 engaging a notch 284 in its nose of the lever 155 for half a cycle or 180° of rotation. The lever 155 is released by the action of one of the two pins 269 or 166 engaging the roller 288 on the latch 268 thereby moving the latch 268 out of the notch 284. As best shown in FIGURE 20, these pins 269 and 166 are at the periphery of the gear 270. Thus the gears 160 and 163 are caused to disengage. The reference numeral 170 represents the pivot point of the motivated lever which shifts the direction change lever 142, and a screw 171 is provided which anchors the loading spring 164. In operation, as shown in FIGURES 17, 18 and 19 when the electromagnet 158 operates the latch piece 157 is pulled by magnetic action toward the body of the electromagnet 158 thereby disengaging the latch from the extension 156 on the bell crank 148. A spring 152 is attached between the bell crank and a point 266 on the frame of the machine which pulls the bell crank lever 148 toward and into contact with the lever 155. When the nose 161 of the bell crank lever 148 strikes the surface 267 on the lever 155, the lever 155 pivots about shaft 162 until the gear 163 which is rotably mounted on its end comes into contact with the gear 160 on shaft 101. The gear 160 which is fixedly mounted on shaft 101 imparts rotation to gear 163 which in turn imparts rotation to gear 278 which is fixedly mounted on gear 163, at the same time that gear 163 is brought into mesh with gear 160, gear 278 is brought into mesh with gear 270 which is rotably mounted on shaft 162. Thus the rotation of gear 278 imparts rotation to gear 270. As gear 270 rotates the cam 165 attached thereto rotates and thus the bell crank lever 148 is forced away from the lever 155 by the cam 165 and cam follower 285 action. The nose 156 of the bell crank lever 148 is thus caused to latch over the element 156.

The yoke 116 which carries the drive shaft 115 and the drive roller 126 is shifted from one side to the other by manipulating the knob 31. Movement of the knob 31 shifts the element 77 and a link 180 is connected to this element 77 at 259 (FIGURES 17, 18 and 19). This link 180 terminates in a knob 181 interposed between two sides of a channel 182 (FIGURE 15). The other end of this channel element is fitted on to the pin 117 which supports the yoke 116. Obviously, movement of the knob 31 in one direction will cause the drive roller 126 to contact one of the discs 227 or 228 and vice versa. The sides of the channel element 182 are made slightly resilient so that a spring-like tension is exerted on the various moving parts. Shifting of the drive roller 126 with respect to the discs 227 and 228 is accomplished by a series of links 127–130 inclusive, and an operating lever 190 is fixed on the shaft 141 which also supports the last link 130, (FIGURE 14). The other end of this operating lever 190 has a manual control knob 39 mounted thereon for movement in the slot 40 (FIGURES 1, 2 and 10). An integral extension 191 is provided on the lever 190 and this rides under a guard 192 which holds the parts in position.

From an inspection of FIGURE 3, it will be noted that the reel driving shaft 45 is in a bearing 200 in the end of a rocker arm 201. The other end of this rocker arm 201 is pivoted on the shaft 57, which supports the drive pulleys and their clutches. A bracket plate 202, having two notches 203 and 204 therein, is pivoted at 209 on the frame of the machine. In FIGURE 3, the rocker arm 201 is shown in full lines with its end supported in the notch 203, and this rocker arm 201 is shown in dash lines as it would be with its end supported in the notch 204 of the supporting bracket 202. The bracket plate 202 is held snug with the rocker arm 201 in both positions by spring 292 which is attached to pin 84 located in the frame of the machine. Shifting the rocker arm 201 to its outermost position allows of the use of larger reels 208 with consequently greater tape capacity. Pin 291 which is slidably received in slot 290 in bracket plate 202 limits the pivotal swing of bracket plate 202.

The operation is as follows: The motor 47 is operated continuously at constant speed in one direction. Through the motor drive pulley 48 the belt 49 is urged at constant speed continuously in one direction. This belt 49 being looped over the pulleys 50 and 51 and the idler 52 will drive the pulleys 50 and 51 in opposite directions at contiuous constant sped. The shaft 250 of the motor 47 is also connected through the flexible coupling 114 to drive the shaft 115. This being splined as shown in FIGURES 4 and 15, slidably supports the drive wheel 126 which is either in neutral position or in contact with either one of the discs 227 or 228. The discs 227 and 228 being mounted on the shaft 101 will drive the capstan 100 in one direction or another and the rate of speed can be manually controlled by the position of the drive wheel 126 through the knob 39. The direction of rotation can be reversed by movement of the knob 31 and can also be automatically reversed by operation of the electro-magnet 158.

In order to automatically accomplish this change of direction, a section of some conductor material is fastened to the outer face of the tape 34, as best shown at 210 in FIGURE 25. These sections 210 are ordinarily glued or otherwise attached to the tape 34 near its ends so that the direction of rotation will be reversed before that end of the tape runs off its supporting reel. Also as best shown in FIGURE 25, the tape 34 is carried into position with regard to the play-heads 32 and 33 and the capstan 100 and its roller 102 by flanged spools 211 which act as guides. Each of these flanged spools 211 includes hub portions 212 and 213 which are metallic and electrically insulated from each other. Current carrying fingers 214 and 215 ride on the respective metallic hubs 212 and 213 and are connected by wires 216 to the electro-magnet 158 and the amplifier 217. These wires 216 carry only a low voltage current which is sufficient to energize the magnet 158 and operate its armature 157 for control of the latch 156.

Whenever it is desired to reverse the direction of rotation of the tape 34 before the same has reached either end, the element 41 (FIGURES 1 and 25) can be manually depressed against its springs 218 and this element carries a conducting plate 219 which will then contact a pair of terminals 220, causing a flow of current through wires 221 which also lead to the magnet 158 and the amplifier 217. In this way, reversal of the tape movement for a play back or other purpose can be manually accomplished at any time.

For rewinding purposes, the knob 31 is manipulated so as to move the drive wheel 126 into neutral position with respect to the discs 227 and 228. The knob 35 is then removed in one direction or the other whereby the cam 68 will actuate one or the other of the friction clutches to cause one reel or the other to rotate rapidly in one direction for rewinding.

It will be noted that the driving discs 227 and 228 and their supporting shaft 101, together with the capstan 100, are positioned at a slight angle to the frame of the machine and the other parts. This will be evident from FIGURES 4, 15 and 26, and enables movement of the tape 34 from one reel 36 to the other 37 or vice versa with practically no twisting thereof.

For de-magnetizing of the tape 34, the knob 31 is pushed inwardly against pressure of the helical spring 193 (FIGURE 29). This allows of an inward movement of the cam plate 91 whereby the pin 110 no longer rides in the slot 111 (FIGURES 18 and 28). The knob 31 can then be turned through at least 90° more in a clockwise direction, enabling actuation of a de-magnetizing and recording switch 194. A receptacle 195 is provided for the insertion of a recording plug-in jack. However, it is not possible to rewind the tape 34 when the device is either in the record or play condition.

The blocks 196 (FIGURE 25) which support the conducting fingers 214 and 215 have felt pads on their reel faces which serve to hold the tape 34 lightly against the recording heads 32 and 33, whereby good contact recording is achieved without appreciable wear on the tape 34.

It will be noted that herein is provided a magnetic tape recorder which presents many advantages over those heretofore produced or on the market. This device provides a two channel recorder with provision for recording in either direction, an automatic reverse, and with the same features on playback. Because of the fidelity requirements of speech and music as recorded upon a magnetic tape, it is necessary that the speed of the tape with respect to either a magnetic recording or a playback head be exactly controlled. If the speed varies periodically, the resultant sound is extremely objectionable. If the tape vibrates at an undesirable rapid frequency, a fluttering sound results. The apparatus of this invention provides a drive for both reels which is not constrained to operate at constant or near constant speed but which will urge the tape under constant tension at all times. This is provided by the unique friction clutch drive for the reels and the distinct but inter-connected variable drive for the tape by way of the capstan. Additionally, the associated relationship of the reels produces a minimum space requirement, while at the same time allowing the employment of reels of different sizes with no additional bulk so far as the cabinet is concerned.

A further advantage of the variable speed drive of the recorder of this invention resides in the fact that variation in tape speed due to eccentricity of the drive disc is eliminated.

I am aware that many changes may be made and numerous details of construction varied throughout a wide range without departing from the principles of this invention, and I therefore do not propose limiting the patent granted hereon otherwise than as necessitated by the prior art.

I claim as my invention:

1. In a magnetic tape recorder having a capstan for controlling the speed and direction of a magnetic tape, a pair of discs frictionally mounted on said capstan, resilient surfaces on said discs, a drive shaft oriented substantially normal to the axis of rotation of said capstan, a drive wheel driven by said drive shaft and slidable thereon in frictional contact with the resilient surface of either of said discs, means for selectively bringing said drive wheel into frictional contact with either of said discs connected to said drive shaft, motor means drivingly connected to said drive shaft, and means for moving said drive wheel along said drive shaft to vary the speed of said capstan.

2. In a magnetic tape recorder having a capstan for controlling the speed and direction of a magnetic tape, a pair of discs frictionally mounted on said capstan, resilient surfaces on said discs, a drive shaft oriented substantially normal to the axis of rotation of said capstan, a drive wheel driven by said drive shaft and slidable thereon in frictional contact with the resilient surface of either of said discs, electromechanical means connected to said drive shaft for selectively bringing said drive wheel into frictional contact with either of said discs, motor means drivingly connected to said drive shaft, and means for moving said drive wheel along said drive shaft to vary the speed of said capstan.

3. In a magnetic tape recorder having a capstan for controlling the speed and direction of a magnetic tape, a pair of discs frictionally mounted on said capstan, resilent surfaces on said discs, a drive shaft oriented substantially normal to the axis of rotation of said capstan, a drive wheel driven by said drive shaft and slidable thereon in frictional contact with the resilient surface of either of said discs, manual and automatic means operatively associated with said drive shaft for selectively bringing said drive wheel into contact with either of said discs, motor means drivingly connected to said drive shaft, and means for moving said drive wheel along said drive shaft to vary the speed of said capstan.

4. A device as described in claim 3, wherein said automatic means includes an electrically operated trip.

(References on following page)

References Cited in the file of this patent

UNITED STATES PATENTS

| | | |
|---|---|---|
| 926,940 | Hammett | July 6, 1909 |
| 940,749 | Swarthout | Nov. 23, 1909 |
| 1,251,784 | Joslin | Jan. 1, 1918 |
| 1,944,238 | Hickman | Jan. 23, 1934 |
| 2,003,968 | Hickman | June 4, 1935 |
| 2,190,465 | Adair | Feb. 13, 1940 |
| 2,213,631 | Heller | Sept. 3, 1940 |
| 2,275,961 | Heller | Mar. 10, 1942 |
| 2,668,059 | Roberts | Feb. 2, 1954 |
| 2,673,040 | Williams | Mar. 23, 1954 |
| 2,719,884 | Reed | Oct. 4, 1955 |
| 2,732,144 | Jones | Jan. 24, 1956 |
| 2,782,999 | Rohling | Feb. 26, 1957 |
| 2,785,892 | Pastor | Mar. 19, 1957 |
| 2,788,209 | Montijo | Apr. 9, 1957 |
| 2,790,643 | Gedde et al. | Apr. 30, 1957 |